United States Patent Office 3,148,501
Patented Sept. 15, 1964

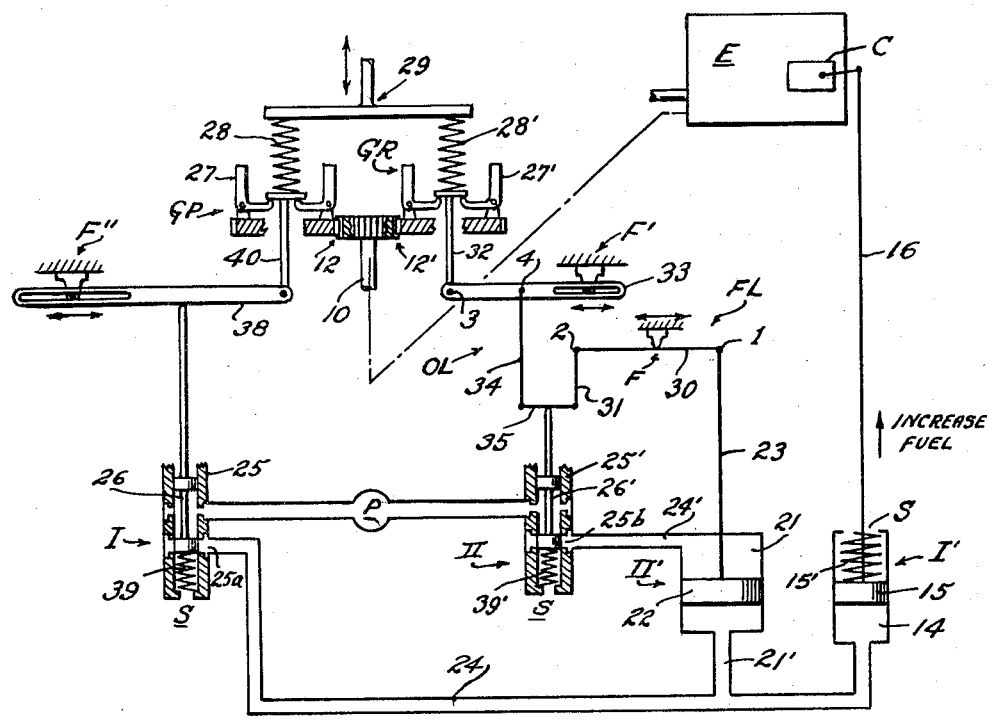

3,148,501
HYDRAULIC GOVERNORS
Rufus Oldenburger, West Lafayette, Ind., assignor to Curtiss-Wright Corporation, a corporation of Delaware
Filed Dec. 19, 1962, Ser. No. 245,695
7 Claims. (Cl. 60—10.5)

This invention relates to improvements in hydraulic governors (automatic control mechanism) and particularly speed governors for engines and other prime movers.

The principal objects of the invention are essentially the same as those recited in my United States Patent 3,051,138 issued August 28, 1962, to the assignee hereof.

Most hydraulic governors presently in commercial use, in order to operate isochronously and to enable performance responsive to amounts of error or deviation from predetermined or selected values and in response to the rate of change of error or deviation employ some form of dashpot including an adjustable leak-off (needle valve) whereby one of the operating constants can be readily varied. The dashpot pistons are subject to sticking, the operation of the needle valves whose orifices must be of small area vary unpredictably with temperature, and variation of the principal operating constant usually affects adversely other desirably variable operating constants so that the optimum adjustability of necessary control parameters is greatly limited. The present hydraulic governor or control mechanism, in common with that of my said patent, has all its hydraulic control passage portions subjected to above-atmospheric pressure to avoid foam in the operating oil; the mechanism has no dashpot, needle valve or other viscosity-sensitive components, and is capable of design or adjustment to enable non-linear response such as fast response for large detected errors and slower response for small errors.

The present hydraulic governor or control mechanism, in common with that of my said patent, is generally insensitive to viscosity changes in the operating oil by reason of having effectively sharp edged orifices where orifices are required; and adjustment of the usual constants, particularly overall governor gain, governor time constant and derivative or rate constant can be independently adjusted over sufficiently wide ranges to enable the governor to be used on a large variety of engines. In the present governor two synchronously operated speed error detecting units are used, which can be essentially identical to economize in cost, thereby enabling the governor to have increased power to operate the necessary pilot valves as compared to a similar governor wherein a single error detecting unit has to operate two pilot valves.

The speed responsive units hereof can very easily be designed one especially for response to amounts of deviation in speed from set value and the other especially for response to rate of changes of speed on part of the governed machines.

Objects and features of the present invention not referred to above will be explained in connection with the illustrative arrangement shown in the drawing.

The drawing is a schematic view showing one embodiment of the present governor or control mechanism.

Referring to FIG. 1, the two error (e.g. speed) detecting or measuring units, generally designated GP and GR respectively, are shown as tachometers arranged to be operated by a common governor drive shaft 10 coupled with or driven in synchronism with an engine E via gear couples 12 and 12' for simultaneous operation of pilot valve units I and II connected hydraulically to control respective servomotors (hereinafter usually servos) I' and II' of two separate hydraulic servomechanisms as will be evident. Servo I' as shown is of the spring biased or spring loaded type for simplification of valving and hydraulic circuitry but, as in my said patent, any other suitable types of servos may be used having appropriately modified pilot valves and hydraulic connections. Servos I' and II', via their pilot valve mechanisms as in said patent, are hydraulically in parallel. A common fluid pressure source for the servomechanisms I, I' and II, II' is indicated at P. Either or both of the gear couples 12 and 12' can, per known practice, constitute (a) a single fluid pressure source for both servomechanisms or (b) essentially separate pressure sources for respective servomechanisms (neither "a" nor "b" illustrated); or some other separate pressure sources for the two servomechanisms can be provided as may be found desirable in practice.

The piston (22) of rate servo II constitutes a movable wall in a rate fluid passage 24', 21, 21', 24 (further described later) between rate or differentiating valve mechanism II and the pressure chamber of servo I'. The connections or passages to sump or negligible pressure regions are indicated S.

Proportionally responsive servo I' has an output piston 15 subjected to pressure in one direction by fluid in pressure chamber 14 against the action of a biasing or loading spring 15'; and the piston acts as through a rod 16 to control the energy input to the mechanism controlled or governed (e.g., engine E via control element C). Rate-responsive servo II' has its output in the form of a piston 22 having a feedback rod 23 leading to its associated pilot valve unit II, as will be explained; and has pressure chambers 21 and 21' formed in part by opposite faces of the piston 22.

Control passages 24 and 24' of respective servos I' and II' enter ports 25a and 25b in respective valve sleeves 25 and 25', and the valve sleeves 25 and 25' contain respective pilot valve plungers 26 and 26' which will hereinafter for simplicity usually be referred to as the pilot valves. The pilot valves 26 and 26', during steady state, occupy neutral or centered (equilibrium) positions as illustrated in respect to the valve ports 25a and 25b under the influence of flyballs 27 and 27' driven by or in synchronism with the engine E as indicated and of opposing forces of respective speeder springs 28 and 28'. For concurrent and desirably equal adjustment or setting of the two speeder springs 28 and 28' a rigid speed setting member 29 is indicated as operating on both speeder springs.

By properly designed porting as at 25b for operating oil to or from the working chamber 21 of rate servo II' (special porting not shown), considerably more or less piston or output motion per valve opening increment can be had on part of the rate servo II' than would result from the same valve opening increment in pilot valve unit I for operation of the output servo I'. Each of the pilot valves can be designed for linear or non-linear operation when desired, as more fully explained in my said patent.

The motion of output piston 22 of the rate servo II' results in a nearly immediate return of the pilot valve 26' to neutral or closed position (neglecting inevitable lag), via suitable linkage FL including, as shown, a lever 30 connected to the rate-servo-connected rod 23 as at pivot 1 and to a link 31 as at pivot 2. The feedback linkage, during operation, reacts on part of an operating linkage OL between the speed error sensing unit or mechanism GR and pilot valve unit II comprising as shown an output rod or link 32 for detector GR, a lever 33 connected thereto as at pivot 3 and a rod or link 34 connected as at pivot 4 to the lever 33. Links or rods 31 and 34 have a suitable evener-type connection means 35 with a stem portion of rate pilot valve 26' as will be evident. In the illustrated arrangement of linkages, light springs 39 and 39' under the pilot valves 26 and 26' respectively continuously take up slack in the linkage pivots, further described below.

Lever 30 has a normally fixed fulcrum F that is adjustable lengthwise of the lever 30 to enable varying of the governor time or lag constant (Tg in said patent) principally in order to adapt the present governor to engines having different acceleration characteristics. The output motions of the proportional servo I' and the rate servo II' are added algebraically through the connected portions of passages 21' and 24 exactly as in said patent.

The rate-valve-connected lever 33 has a adjustable but normally fixed fulcrum F' by which the ratio of movement of output rod 32 of error sensing tachometer unit GR and the resulting movement of rate valve 26' can be adjusted to vary the derivative constant (or generally rate-responsive action) of the governor (Td in said patent), independently of the adjustment provided inter alia by fulcrum F.

The flyballs of tachometer unit GP act upon the pilot valve unit I for control of proportionally acting servo I' via a lever 38 connecting an output rod 40 of unit GP to a stem portion of pilot valve 26. Lever 38 has a normally fixed but adjustable fulcrum F'' for enabling adjustment of the governor gain constant ($K_2$—see said patent) or the ratio between amounts of detected speed error and the proportional servo output movements (via rod 16 and the engine control element C).

Normally fixed fulcrums F, F' and F'' are suitably designed for adjustment lengthwise of their associated lever elements. Preferably, for negligible effect of each adjustment on the others, the order of making the adjustments of the constants mentioned is: F (Tg), F'' ($K_2$) and F' (Td).

Various refinements not shown can of course be used. For example any of the various levers 30, 33 and 38 can, for increasing their range and to avoid side thrust on associated valves, pistons etc., be made as double levers as in said patent, FIG. 5 thereof. The levers would preferably, so far as possible, be in side-by-side or otherwise compact relative arrangement (e.g., as suggested in FIG. 3 of said patent). Further, various modes of operation (e.g.) as for simple isochronous action, isochronous with rate action and isochronous with droop action can be accomplished as in my said patent, inter alia by providing a three way valve, not shown, in the communication passage 21' between the rate servo II' and the control passage 24 of the main governor servo I'.

The operation of the above described mechanism is essentially exactly the same as in my said patent. This operation generally is as follows:

Departure from neutral or closed position on part of pilot valve 26 initiates output movement of proportionally operating servo I' simultaneously with output movement of rate servo II' via operation of pilot valve 26'. The amount and direction of total governor output motion via rod 16 is determined by the direction of detected error—whether positive or negative and is the algebraic summation of the outputs of servos I' and II', added hydraulically. During acceleration of the engine for example following a decrease in its loading the effectually fast action of the rate servo II' causes accelerated total output movement of the rod or link 16, or faster action than would have occurred solely through operation of the proportional servomechanism of the system (valve 26 and movement of piston 15) so that the amount of speed error or departure from set value will be lessened or minimized. During deceleration of engine speed, following complete or partial fuel correction, the restoring action through operation of rate servo feedback rod 23 via lever 30 and link 31 to reposition the rate pilot valve 26' to closed condition tends, as in the case of dashpot governors, to delay or retard restoration of the engine speed to its set value, thereby to minimize overshoot. The the action of the rate-responsive portions of the present governor mechanism corresponds operationally to so called "secondary compensation" or integrating action in a hydraulic governor having some form of dashpot. Set speed is restored finally by the proportionally acting ballhead GP through centering of the pilot valve 26 or movement of it to neutral or off position in one or more steps as in the case of any hydraulic isochronous governor. Operation for increased engine load or equivalent disturbance is exactly the opposite of that described above.

I claim:

1. A proportionally plus rate responsive hydraulic governor, comprising two error detecting units, a proportional valve connected for operation in opposite directions from a neutral position by one of the units, a rate valve connected for operation in opposite directions from a neutral position by the other of said units, a main servo having a pressure chamber hydraulically connected to the proportional valve for movement of an output member of the main servo in opposite directions, a rate servo having a pressure chamber hydraulically connected to the rate valve for movement of an output member of the rate servo in opposite directions and having a second pressure chamber, feedback means between the output member of the rate servo and the rate valve operable to close the rate valve as a function of movement of the rate servo output member in either direction, and hydraulic means connecting the second pressure chamber of the rate servo to the pressure chamber of the main servo for effecting algebraic addition of the output motions of the two servo output members.

2. A hydraulic governor comprising two error-detecting units responsive to a single source of error signal energy, a hydraulic servo having a pressure chamber and an output member exposed therein and operative to effect correction of error, a pilot valve connected for movement by one of said units to control fluid in a channel leading to the servo to initiate error-correcting movements of the output member proportionally to detected amounts of error, a differentiating valve connected for operation by the other detecting unit and for operation to control movement of a differentiating wall member in and transversely blocking another fluid channel leading to said servo pressure chamber so that movement of fluid contained in said other channel can modify the proportional movements of the output member, and feedback means connecting said differentiating wall member to the differentiating valve and operating thereon in a manner to close that valve as a function of movement of said wall member.

3. A hydraulic governor comprising error-detecting means including two separate detecting units responsive to a single source of error signal energy, first and second pilot valves connected for operation by respective units, first and second servos hydraulically connected for operation respectively by the first and second pilot valves, pressure chambers of the servo motors being hydraulically interconnected so that operation of the second servo can modify the operation of the first servo, and feedback means between the second servo and the associated pilot valve operative to close that valve consequent upon movement of the output member of that servo in either direction.

4. A hydraulic governor comprising a source of hydraulic pressure fluid, first and second pilot valves connected with said source, first and second servos hydraulically connected to their respective pilot valves and hydraulically interconnected in parallel so that operation of the second servo will modify the operation of the first servo, separate spring loaded error-detecting units having a common input and separate output means connected for operation of respective pilot valves responsive to detected error, and means connected simultaneously to vary the spring loading of the error detecting units.

5. A hydraulic speed governor for prime movers, comprising a source of hydraulic pressure fluid, first and second pilot valves hydraulically connected with said source, first and second servos hydraulically connected to their respective pilot valves and hydraulically interconnected in parallel so that output operation of the second servo will modify the output operation of the first servo, separate speeder-spring-biased centrifugally acting error-detecting units connected for operation of respective pilot valves, and speed setting means connected simultaneously to vary the biasing forces of the springs.

6. A hydraulic governor comprising two variably spring loaded error-detecting units, means for simultaneously setting the spring loading of the two units, first and second pilot valves, first and second hydraulic servos each having an output member and each having a pressure chamber connected hydraulically with a respective pilot valve, levers connecting the first and second pilot valves to respective error-detecting units, a feedback lever operatingly interconnecting the output member of the second servo and the second pilot valve, normally fixed fulcrums for each of the levers, means for adjusting at least one of the fulcrums lengthwise of its associated lever, and hydraulic means interconnecting the output member of the second servo and the pressure chamber of the first servo in a manner to modify movements of the first servo output member as a function of movement of the output member of second servo.

7. The hydraulic governor according to claim 6 wherein each of the fulcrums is adjustable lengthwise of its associated lever.

No references cited.